United States Patent [19]

Aoki

[11] Patent Number: 4,828,863
[45] Date of Patent: May 9, 1989

[54] METHOD AND APPARATUS FOR SUPPLYING A UNIFORM AMOUNT OF A LOOSE FOOD MATERIAL

[75] Inventor: Shigeru Aoki, Utsunomiya, Japan

[73] Assignee: Rheon Automatic Machinery Co., Ltd., Utsunomiya, Japan

[21] Appl. No.: 137,091

[22] Filed: Dec. 23, 1987

[30] Foreign Application Priority Data

Dec. 26, 1986 [JP] Japan ................. 61-308846

[51] Int. Cl.$^4$ ..................... A21C 11/18; A23G 9/28
[52] U.S. Cl. ................. 426/512; 99/450.7; 222/381; 425/239; 425/240; 425/241
[58] Field of Search ............. 426/512; 425/239, 240, 425/241; 99/450.7, 450.8; 222/309, 381

[56] References Cited

U.S. PATENT DOCUMENTS 2,000,027  5/1935  Kazanjian ..................... 425/240
2,012,682  8/1935  Johnson ........................ 425/239
3,658,013  4/1972  Neumann et al. ............. 425/238
4,669,967  6/1987  Hayashi et al. .............. 425/376 R
4,776,497 10/1988  Hayashi et al. .............. 222/235

*Primary Examiner*—George Yeung
*Attorney, Agent, or Firm*—Finnegan, Henderson, Farabow, Garrett & Dunner

[57] ABSTRACT

An apparatus for supplying a uniform amount of a loose food material comprising a hopper, a rotating drum and a pushing mechanism. In the apparatus, the material is introduced in pockets on the periphery of the drum and then compressed by a piston mechanism into a solid or cohesive form by pushing it, together with an additional amount of the material, against the piston provided in each of the pockets. Then the material, as shaped into a form, is discharged from the pocket onto a dough sheet. The material is compressed to a high density and a uniform shape.

9 Claims, 3 Drawing Sheets

METHOD AND APPARATUS FOR SUPPLYING A UNIFORM AMOUNT OF A LOOSE FOOD MATERIAL

BACKGROUND OF THE INVENTION

1. Field of the Invention

This invention relates to an apparatus for supplying a uniform amount of a loose food material which is used as a filling material in a pie dough coating. In particular, to an apparatus for supplying to pie dough, at regular intervals, a loose and relatively fragile food material, such as a filling material for Eccles cakes.

2. Prior Art

A food which is commonly referred to as Eccles cakes uses a dough material comprising multiple layers of dough, and fat such as butter, which are alternately disposed and folded upon themselves. A filling is placed on top of the dough, and another layer of folded dough is then placed upon the filling to cover it, and the coated filling is then stamped out by a stamp cutter to take a circular form, and is then baked in an oven to be completed as a cake.

A filling which is inserted into such a cake comprises butter, sugar, a fruit such as an apple from which the skin and the core are removed, the peels of a fruit, raisins, spices such as cloves or nutmeg, and/or juice such as lemon juice, orange juice, or the like.

Such a filling can be molded into a desired form because it is adhesive and easily crushed. Since such a material tends to become chunky and its density in the hopper is not uniform, it is difficult for an apparatus to supply a uniform amount of such a material.

Accordingly, when an Eccles cake is produced, a baker manually supplies a preselected amount of the filling on top of the dough, then folds the dough to enclose the filling, stamping out a circular dough enclosing the filling and finally baking the circular dough. However, these steps are performed manually and the number of cakes that can be produced is limited. Therefore, such a process has not been suitable for mass production.

Eccles cakes have not been popular in Japan. However, because of the recent trend demanding higher quality cake breads, and consumer's preferences for greater variety, a demand has arisen for foods such as Eccles cakes, and thus there is a need to satisfy such demands.

U.S. Pat. No. 2,012,682 discloses a combination roll-making machine in which dough is divided and molded. In this apparatus, dough in the hopper is propelled toward a rotating drum which is mounted on the open bottom of the hopper. The dough is then introduced into one of the pockets provided on the periphery of the drum. In each pocket a piston is provided. Since the piston advances to the periphery of the drum when the drum is rotated, the dough is pressed against the molder band supported adjacent the drum to mold the dough in the pocket into a form. Finally, the formed dough is ejected from the apparatus.

However, if the apparatus is used for dividing a loose material such as one used for a filling for Eccles cakes, a portion of the material which extrudes from the pocket drops through the space between the drum and the molder band when the piston advances and the material is made to progress through the space between the drum and the molding band. Since the material is shaped in this space, the form of the material output is not uniform, and often breaks the form due to the friction. Further, as stated above, such a material tends to become chunky and has air pockets. Thus the density of the material introduced into the pocket is not uniform. Therefore, each portion of the loose material divided by the apparatus does not have the same amount of material.

SUMMARY OF THE INVENTION

The object of this invention is to provide an apparatus for supplying a uniform amount of a loose material that can be easily crushed or broken, such as a compound of chopped peels of oranges, grapes or the like as mentioned above, at given intervals, onto dough being transferred at a given speed.

According to one aspect of this invention, an apparatus for supplying a uniform amount of a loose food material is provided, comprising
(a) a hopper with an open bottom,
(b) a rotating drum formed with at least one pocket adjacent the periphery thereof and mounted to the bottom of said hopper to receive said material in said pocket,
(c) a piston provided in said pocket and movable in the radial direction of said drum so that it retracts where it faces the bottom of the hopper to allow said material to move into the space in the pocket created by the retraction, which piston advances to the periphery of the rotating drum after the rotating drum rotates to such a point where the pocket which has received said material comes out of the bottom of the hopper, so as to eject said material, and
(d) means for regulating the movement of said piston, characterized by
a pushing means, positioned at the downstream end of the hopper in the direction of rotation of said rotating drum for pushing an additional amount of said material in the hopper into said pocket while said piston is still in a retracted position, thereby shaping said material into a form corresponding to the form of the space in said pocket formed when the piston is at its retracted position.

According to another aspect of the present invention, a method for supplying a uniform amount of a loose material is provided, comprising the steps of
(a) introducing a portion of said material from a hopper into a space formed by retracting a piston positioned in a pocket provided adjacent the periphery of a rotating drum,
(b) pushing an additional amount of said material in the hopper into said pocket while said piston is still in a retracted position for shaping said portion of said material into a form corresponding to the form of the space in said pocket formed when the piston is at its retracted position,
(c) rotating said drum while advancing said piston to the periphery of the drum,
(d) stopping the advancement of the piston when it has reached the periphery of the drum to eject said shaped portion of said material, and
(e) rotating said drum while retracting said piston to receive another portion of said material.

In the apparatus of the present invention, a loose material is introduced into a pocket on the periphery of the rotating drum and shaped into a form by pressing against the piston provided in the pocket with the pushing means.

When the material is pressed against the piston, an additional amount of the material is introduced and compressed with the material which has already been introduced in the pocket. Thus no space is left in the material in the pocket and a uniformly high density of material is formed in the pocket, which means that the same volume or form has the same weight. As the drum rotates, the piston advances to the periphery of the drum until the formed material is ejected. Therefore, the same amount of the loose material is automatically supplied.

Moreover, the formed material is ejected and dropped at selected intervals on dough conveyed past the drum. Then the dough is folded to enclose the lose material. By stamping out a circular dough enclosing the dough and then baking it, an Eccles cake is provided. Since all of the steps can be automated, Eccles cakes can be automatically produced. This process is suitable for mass production.

EMBODIMENTS

Figure 1:
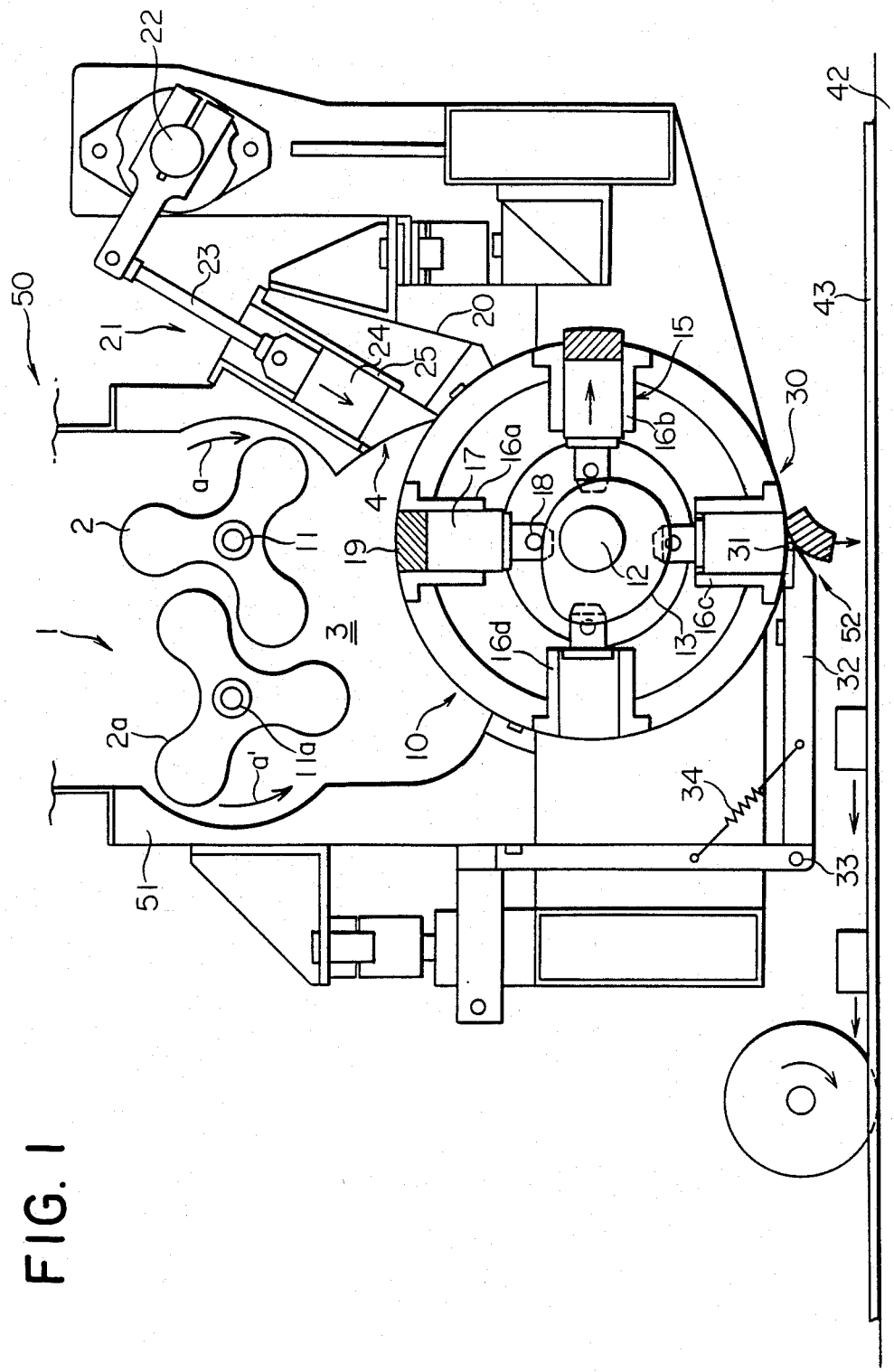
FIG. 1 shows a schematic cross-sectional view of the apparatus according to the present invention.

A preferred embodiment of this invention will now be described by reference to the drawings. In FIG. 1, an apparatus for supplying a uniform amount of a loose food (50) of a preferred embodiment is shown. The apparatus (50) comprises a hopper (1) with an opening bottom, a rotating drum (10) mounted to the bottom of the hopper (1) and a piston mechanism (21) adjacent the rotating drum (10). Disposed in the hopper (1) are a pair of Roots fans (2, 2a) which propel a loose filling material into the hopper (1) toward a lower chamber (3) located near the bottom of the hopper (1). The pair of Roots fans (2, 2a) are mounted on rotating shafts (11, 11a) so that the right fan (2) rotates clockwise and the left fan (2a) rotates counterclockwise as indicated by arrows a and a' in FIG. 1.

The rotating drum (1) is mounted to a frame (51) so that it is positioned adjacent the open bottom of the hopper (10) and axially rotates about an axis (12) clockwise by a conventional driver mechanism. One example of such a mechanism is a gear system described in U.S. Pat. No. 2,012,682 which is incorporated herein as a reference.

The drum (10) has four piston mechanisms (15) comprising pockets (16a, 16b, 16c, 16d), pistons (17) on the periphery of the drum (10), equally spaced apart from each other. The pockets (16) are cylindrical holes provided in the radial direction of the drum (10). In each pocket, the piston (17) is provided so that it is slidably movable along the inner wall of the pocket (16). Each piston (17) has a piston rod with a cam follower (18) at the inner end.

Around the axis (12), a cam (13) is mounted so that the cam followers (18) move along the periphery of the cam (13). Since the axis (12) is stationary and the cam (13) is fixed to it, the drum (10) rotating around the cam (13), the cam followers (18) move along the periphery of the cam (13) so that the pistons (16) slidably retract from and advance to the periphery of the drum (10) in the radial direction of the drum (10). Accordingly, a space (19) is provided in the pocket (16) when the piston (16) retracts while the front end of the piston (16) becomes coplanar with the periphery of the drum (10). The space disappears when the forward end of the piston arrives at the periphery of the drum.

At the downstream end of the hopper (1) in the direction of rotation of the drum (10), a piston mechanism (21) is disposed. The piston mechanism (21) comprises an enclosure (20) defining a cylinder chamber (25) and a piston (24) slidably movable along the inner surface of the cylinder chamber (25). In this embodiment, the bottom of the front end wall of the hopper (1) has a rounded shoulder portion as shown in FIG. 1, defining an additional area (4) of the hopper (1), with the surface of the drum (10). On the rounded shoulder portion of the hopper (1) an opening is provided. Through this opening, the additional area (4) of the hopper (1) communicates with the cylinder chamber (25).

The piston (24) is arranged to reciprocate in the cylinder chamber (25) toward and away from the surface of the drum (10), in its radial direction. Due to this structure, the cylinder chamber (25) is disposed adjacent the drum (10) so that the piston (24) can move toward one of the pockets (16) when it is aligned with the passageway of the piston (24). The end of the piston (24) away from the drum (10) is connected to a conventional driver means (22) via a rod (23). The driver means (22) causes the piston 24 to move back and forth. When it retracts the piston (24), the loose filling material adjacent the intended area (4) of the hopper is introduced into the cylindrical chamber (24), and when the driver means (22) moves the piston (24) forward, the piston propels the filling material to the periphery of the drum (10) so that the material is pushed into the space (19) of the pocket (16) which is positioned in alignment with the passage of the piston (24). In FIG. 1, the pocket (16a) will come into alignment with the piston (24) when it rotates clockwise about 30°.

In the apparatus (50), a discharge area (30) is located between the positions corresponding to 4 o'clock and 6 o'clock as viewed in FIG. 1. In this embodiment, as will be discussed later, the discharge area (30) is located at the position corresponding to 6 o'clock. At the discharge area (30), the piston (17) advances to the fullest extent and its front end becomes coplanar with the periphery of the drum (10) so that the material on the front end can drop on the conveyor (42) running underneath the discharge area (30).

Further, in the downstream end of the discharge area (30) in the direction of rotation of the drum (10), a cleaner (52) is provided. The cleaner comprises a pair of arms (32) extending on both sides of the drum (10) and a piano wire cutter (31) connecting the two arms (32). The arms (32) are pivotally connected to a shaft (33) supported by a pair of vertical arms extending from the frame (51). Each arm (32) is also connected to the frame by a spring (34) so that the piano wire cutter (31) is urged to contact the periphery of the drum (10) imparting a preselected pressure to it. Thus part of the material still remaining on the surface of the piston (24) after it passes the discharge area (30) is removed from the piston (24) by the piano wire cutter, which scrapes the surface of the piston.

The operation of the apparatus (50) will now be discussed. In this preferred embodiment, the material in the hopper (1) is a filling material to be enclosed in pie dough sheets for an Eccles cake and is a loose material that includes peels of fruits, raisins, spices, juices, or the like, as stated above.

Figure 2:
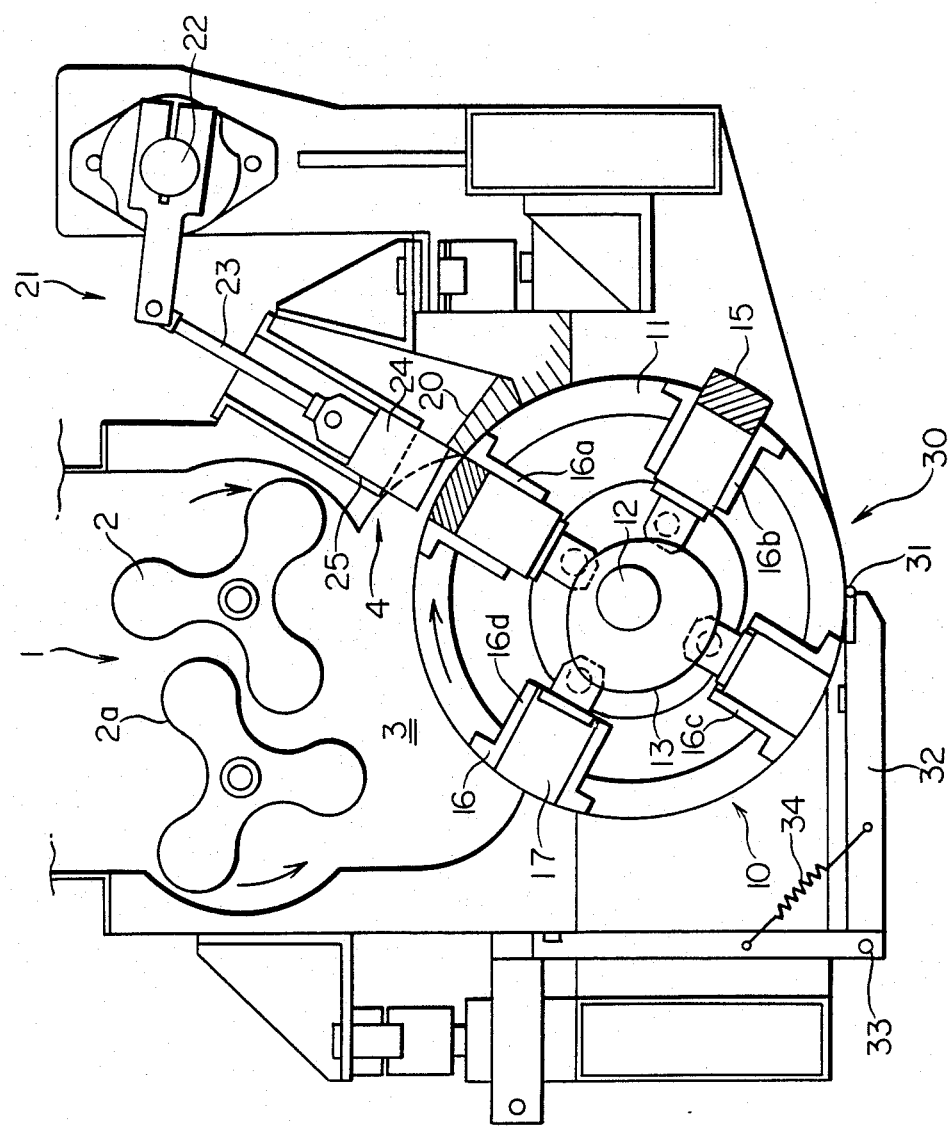
FIG. 2 shows the apparatus of FIG. 1 in which the drum is rotated clockwise at a 30° angle from the position of the drum in FIG. 1.

As it will be understood from the shape of the cam (13), the piston (17) begins to retract when the pocket (16) reaches the position corresponding to 10 o'clock of the drum (10), like the pocket (16d) in FIG. 2. Then the piston (17) completely retracts to provide the space (19) in the pocket (16) when the pocket (16) is vertically positioned with its front end facing the bottom of the hopper (1), like the pocket (16a) in FIG. 1.

Urged by the rotation of the Roots fans (2, 2a), the material progresses downward through a space between the side walls of the hopper (1) and the Roots fans (2, 2a) into the lower chamber (3).

Since the material in the lower chamber is pushed by the additional material introduced by the Roots fans (2, 2a), the material goes into the space (19) in the pocket (16a). In FIG. 1, the hatched area shows the material introduced into the space (19). In this preferred embodiment, the Roots fans (2, 2a) are arranged to provide a space between them so that the material can escape from the lower chamber (3) through the space when too much material is introduced and excessive pressure is imparted to the material in the lower chamber (3). Thus the density of the material becomes uniform throughout the lower chamber (3).

Along with the rotation of the drum (10), the pocket (16a) reaches a point adjacent the additional area (4), positioned at 1 o'clock as viewed in FIG. 1. As shown in FIG. 2, when the pocket (16a) is positioned to align with the passage of the piston (24), the driver means (22) advances the piston (24) toward the pocket (16a) to push the material in the cylindrical chamber (25) and the additional area (4) to the space (19). Thus the additional material is introduced into the space (19) and the material already in the space (19) and the additional material are compressed together in the space (19) by the piston (24) pressing against the front end of the piston (16a).

When compressed, the loose material is shaped into a form corresponding to the space (19). Then the piston (24) is retracted and removed from the additional area (4). As the drum (10) further rotates, the material is carried in the space (19) until the pocket (16) reaches the position of 3 o'clock of the drum (10), like the pocket (16b) in FIG. 1, where the slight rise of the cam surface has slightly elevated the piston so that the material in the space somewhat protrudes from the periphery of the drum (10). Then the piston (17) begins to advance to the periphery of the drum (10) and extrudes the material as shown in the pocket (16b) in FIG. 2. Since the material is compressed into a form defined by the space (19) and tends to adhere to the front end of the piston (17), the material does not come off from the piston (17) until the pocket (16) reaches the discharge area (30).

At the discharge area (30), the material comes off and drops onto the pie sheet (43) conveyed on a conveyor (42) running underneath the discharge area (30). The piston (17) is then positioned so that its front end is coplanar with the periphery of the drum (10). Part of the material still remaining on the front end of the piston (17) is cleared by the piano wire when the pocket (16) passes it.

It should be noted that the position of the discharge area is determined by the characteristics of the material, such as adhesivity and cohesiveness. However, since the pockets are disposed at selected intervals in the periphery of the drum, the material is applied on the pie sheet (43) at selected intervals. If the material is highly adhesive, it will not come off from the effect of its own weight, even if the pocket (16) reaches the discharge area. In such a case, the material is peeled off from the front end of the piston (17) by the piano wire cutter (31), like the material from the pocket (16c) in FIG. 1.

Along with the rotation of the drum (10), the pocket moves past the cutter (31), with the piston (17) being positioned near the periphery of the drum, until the pocket (16) reaches the position corresponding to 10 o'clock of the drum, where the piston (17) begins to retract to receive the material again as stated above.

Figure 3:
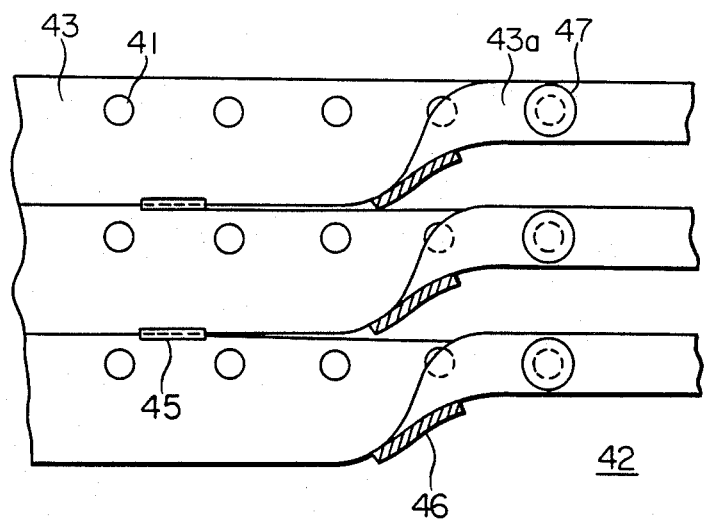
FIG. 3 shows a schematic plan view of the dough with the filling material, conveyed by the conveyor. It illustrates the process for producing Eccles cakes after the filling material is provided on the pie dough sheets.

In this preferred embodiment, four pockets (16) are disposed on the periphery of the drum (10) at an angle of 90° against each other. However, more pockets (16) can be disposed at any desired angle. The pockets can also be disposed in rows and columns on the periphery of the drum (10). In such an embodiment, a plurality of the piston mechanisms (21) will be provided corresponding to the number of rows of the pockets (16). In such a case, the same number of pieces of the compacted material can be produced in rows. They are deposited at intervals on the wide pie dough sheet (42) as shown in FIG. 3. Such an embodiment is very advantageous for mass production of Eccles cakes.

As mentioned earlier, the pie dough sheet on which the material is applied is folded to enclose the material at the next station of the Eccles cake production line. In FIG. 3, the pie sheet (43) is divided into three sheets by cutters (45) and then folded by guides (46) to enclose the material (41), resulting in a filling-material enclosing pie sheet (43a).

Then, the sheet (43a) is stamped out by a circular cutter (not shown) as indicated by a circle (47). To seal the upper and lower circular pie sheets enclosing the filling material (41), they are pressed against each other around their periphery by a pressing machine. Thus the upper and lower sheets cannot separate or expose the filling material (41) during the baking step and thus Eccles cakes of a uniform size and good quality are produced.

Alternatively, the circular cutter and the pressing machine can be incorporated into a single device for performing the cutting and sealing steps simultaneously.

Because the apparatus of this invention shapes or molds a loose food material into a solid form even if the material is not suitable for a conventional shaping operation, the material becomes easily handled. According to this invention, a uniform amount of material can be supplied on a pie sheet at selected intervals. Thus a process to produce Eccles cakes suitable for automation and mass production is provided.

Moreover, in the apparatus of this invention, the loose material is compressed into a solid form, and fillings of the same shape, density, and volume are provided.

I claim:
1. An apparatus for supplying a uniform amount of a loose food material, comprising
   (a) a hopper with an open bottom,
   (b) a rotating drum formed with at least one pocket adjacent the periphery thereof and mounted to the bottom of said hopper to receive said material in said pocket, (c) a piston provided in said pocket and movable in the radial direction of said drum so that it retracts where it faces the bottom of the hopper to allow said material to move into the space in the pocket created by the retraction, which piston advances to the periphery of the rotating drum after the rotating drum rotates to such a point where the pocket which has received said material comes out of the bottom of the hopper, so as to eject said material, and (d) means for regulating the movement of said piston, characterized by a pushing means, positioned at the downstream end of the hopper in the direction of rotation of said rotating drum for pushing an additional amount of said material in the hopper into said pocket while said piston is still in a retracted position, thereby shaping said material into a form corresponding to the form of the space in said pocket formed when the piston is at its retracted position.

2. The apparatus of claim 1 wherein said hopper comprises means to propel said material toward said pocket.

3. The apparatus of claim 1 or 2, further comprising a plurality of said pockets, each with said piston, which are arranged in rows and column around the periphery of said rotating drum.

4. The apparatus of claim 3, wherein said regulating means comprises a cam follower mounted to each said piston and a cam engaging said cam follower.

5. The apparatus of claim 4 further comprising a cleaning means placed adjacent said drum for cleaning the outer surface of each said piston after it has advanced to the periphery of the drum.

6. The apparatus of claim 5, further comprising a conveyor means to receive and transfer said material ejected from said drum.

7. The apparatus of claim 6 wherein said pushing means comprises a piston cylinder mechanism arranged to reciprocate toward and away from the drum surface.

8. A method for supplying a uniform amount of a loose food material, comprising the steps of (a) introducing a portion of said material from a hopper into a space formed by retracting a piston positioned in a pocket provided adjacent the periphery of a rotating drum mounted in said hopper, (b) pushing an additional amount of said material in the hopper into said pocket while said piston is still in a retracted position for shaping said portion of said material into a form corresponding to the form of the space in said pocket formed when the piston is at its retracted position, (c) rotating said drum while advancing said piston to the periphery of the drum, (d) stopping the advancement of the piston when it has reached the periphery of the drum to eject said shaped portion of said material, and (e) rotating said drum while retracting said piston to receive another portion of said material.

9. The method of claim 8, wherein the method for supplying a uniform amount of loose food material includes supplying a loose food material comprising a filling containing chopped fruits and peels.

* * * * *